US009350860B2

(12) United States Patent
Lagadec et al.

(10) Patent No.: US 9,350,860 B2
(45) Date of Patent: *May 24, 2016

(54) VOICE INTERACTIVE SERVICE SYSTEM AND METHOD FOR PROVIDING DIFFERENT SPEECH-BASED SERVICES

(71) Applicant: Swisscom AG, Bern (CH)

(72) Inventors: Roger Lagadec, Regensdorf (CH); Patrik Estermann, Schwerzenbach (CH); Luciano Butera, Zurich (CH)

(73) Assignee: SWISSCOM AG, Bern (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/509,829

(22) Filed: Oct. 8, 2014

(65) Prior Publication Data

US 2015/0023480 A1   Jan. 22, 2015

Related U.S. Application Data

(63) Continuation of application No. 12/869,448, filed on Aug. 26, 2010, now Pat. No. 8,886,542.

(60) Provisional application No. 61/237,160, filed on Aug. 26, 2009.

(51) Int. Cl.
*G10L 21/00* (2013.01)
*G10L 25/00* (2013.01)
*G10L 13/00* (2006.01)
*H04M 3/493* (2006.01)
*G10L 13/047* (2013.01)
*G10L 15/32* (2013.01)

(52) U.S. Cl.
CPC ........... *H04M 3/4936* (2013.01); *G10L 13/047* (2013.01); *G10L 15/32* (2013.01)

(58) Field of Classification Search
USPC .................................................. 704/231–257
See application file for complete search history.

(56) References Cited

U.S. PATENT DOCUMENTS 6,728,677 B1   4/2004   Kannan et al.
(Continued)

FOREIGN PATENT DOCUMENTS

WO         0163892      8/2001
WO         0227708      4/2002
WO       2007050358     5/2007

*Primary Examiner* — Jesse Pullias
(74) *Attorney, Agent, or Firm* — McAndrews, Held & Malloy, Ltd.

(57) ABSTRACT

Systems and method are provided for rendering different speech-based services to a plurality of users. A service-providing system may be accessed via a plurality of connectivity ports. Each of the connectivity ports may be associated with at least one of a plurality of different speech-related services. The connectivity ports may be associated with the different speech-related services may be performed before receiving user service requests. The service-providing system may comprise a plurality of processing components, each of which may be configurable to provide one or more of a plurality of different speech-related services. The service-providing system may further comprise a connection component, which may be operable to establish a connection between the respective connectivity port and a processing component having a configuration of suitable for performing a service requested through the respective connectivity port.

20 Claims, 3 Drawing Sheets

(56) References Cited

U.S. PATENT DOCUMENTS

| | | |
|---|---|---|
| 6,785,653 B1 | 8/2004 | White et al. |
| 7,206,387 B2 | 4/2007 | Jan et al. |
| 7,263,177 B1 | 8/2007 | Paterik et al. |
| 8,078,743 B2 | 12/2011 | Sharp et al. |
| 8,886,542 B2 * | 11/2014 | Lagadec ............... G10L 13/047 704/200 |
| 2002/0138267 A1 | 9/2002 | Damiba |
| 2005/0041788 A1 | 2/2005 | Jan et al. |
| 2008/0154602 A1 | 6/2008 | Hollander et al. |
| 2009/0154690 A1 | 6/2009 | Wu |

* cited by examiner

VOICE INTERACTIVE SERVICE SYSTEM AND METHOD FOR PROVIDING DIFFERENT SPEECH-BASED SERVICES

CROSS-REFERENCE TO RELATED APPLICATIONS

This application is a continuation/divisional of U.S. patent application Ser. No. 12/869,448 filed Aug. 26, 2010, which in turn claims the benefit of priority under 35 U.S.C. §119 to the U.S. Provisional Patent Application Ser. No. 61/237,160, filed Aug. 26, 2009. Each of the above identified applications is hereby incorporated herein by reference in its entirety.

FIELD OF THE INVENTION

The present invention relates to a voice interactive service system and a method for providing different speech-based services to a plurality of users. Specifically, the present invention relates to a system and a method for providing different voice interactive speech-based services to a plurality of users accessing the system in each case with a communication terminal via a telecommunication network through one of a plurality of connectivity ports.

BACKGROUND OF THE INVENTION

Particularly for implementing voice or speech controlled information services which are accessible from mobile or fixed communication terminals via telephone networks and/or voice over IP links, voice or speech processing systems need to be configured to provide concurrently complex voice interaction services to a large number of users, e.g. to hundreds or thousands of concurrent users. For example, such voice or speech controlled information services include public information services, such as telephone directories, public transportation schedules, weather forecasts, sports results or other public information or databases, or personal information services, such as voice memos, text messages, contact lists or other personal information or databases. Specifically, these voice or speech processing systems need to provide voice or speech recognition services, voice or speech synthesis services, as well as dialogue control functions.

When implementing voice or speech controlled service platforms which support complex voice interaction for a large number of users, it is common practice to allocate dynamically to active users who request a service in each case a fixed resource (a "port") which makes it possible for the user to be connected to the service platform. However, the software and/or hardware resources required for the actual voice interaction (e.g. different types of automatic speech recognition, speech synthesis, dialogue management, access to user-specific grammars and languages, etc.) are typically accessed on demand from various networked resource pools dedicated to specific functions. In other words, a user will first be connected to a port, and subsequently, depending on the details of the interaction and/or a user profile, the port requests (dynamically or ad-hoc) voice or speech processing resources for supporting the user, e.g. speech recognition resources from a dedicated Automatic Speech Recognition (ASR) server, speech synthesis resources from a separate dedicated Text-to-Speech (TTS) server, etc. While this combined approach of fixed allocation of connectivity resources and on-demand allocation of speech processing resources may be efficient for cases where there is little a priori knowledge about the statistical requirements for speech recognition and synthesis functions, for example, it may have significant drawbacks otherwise. Particularly, requesting and accessing signal processing resources from remote servers requires the transmission of control signals as well as the speech signals to be processed, in both directions and possibly over long distances with corresponding delays, and involves various signal exchange protocols, formatting and de-formatting functions, fluctuations in the transmission delays of individual data packets, signal buffering for compensation of these delays, and response times of the different parts of the distributed system, etc.). The protocols for requesting, providing and allocating resources represent a significant overhead with some amount of inertia. They are generally designed for efficient operation under stable on-demand conditions. In the case of voice interaction between a human user and a system, however, extraneous conditions (e.g. misrecognition, lack of user familiarity with system dialogue rules, ambient noise, other forms of distraction or disturbance, barge-in, etc.) will often lead to unscheduled cancellations or interruptions—conditions which slow down overall system response and use up significant resource allocation and management time. When a user calls the service, voice interaction will be secured only if ASR and TTS resources are available whenever the user requires them. Failure in the availability of any one single resource will normally lead to a negative user experience and often to the user session being aborted—this in spite of the fact that a port had actually been dedicated, i.e. specifically allocated to the user, leading to the expectation that the service is fully available.

A change in the offered services will often lead to a change in the statistics of the resources to be provided centrally—either in terms of processing power, and/or in terms of the time requirements to be accommodated. This will reflect, in a complex way, on the overhead for resource allocation, with an impact on performance which cannot always be predicted in a simple fashion. The result may either be a systematic over-design of the system (with the aim to prevent resource congestion), or unexpected performance bottlenecks.

Generally speaking, a system for real-time allocation of resources supporting an unpredictable voice interaction is extremely complex, and the inherent complexity of such a system is ultimately reflected in costs incurred when setting up and operating the system.

US 2002/0143551 describes a spoken dialogue system that switches between various architectural configurations for implementing speech recognition functions based on user functionality and network conditions. According to US 2002/0143551, a client device, particularly a mobile device such as a cellular phone, is connected via a network link, e.g. a telephone network, to a server computer. Depending on the architectural configuration, speech recognition functions such as feature extraction and small vocabulary decoding are performed partly or entirely on the client device or on the server, whereas speech recognition functions such as large vocabulary decoding and natural language processing are performed typically on the server. While the dialogue system of US 2002/0143551 may be advantageous for distributing speech recognition processing over a client device and a server, it does not appear particularly suitable for large scale speech recognition processing involving speech controlled service requests from thousands of callers using a variety of different client devices.

WO 02/27708 describes a call processing system connected to a Public Switched Telephone Network (PSTN) and comprising a plurality of signal processing cards. The signal processing cards provide interactive voice response (IVR) functions and are each configured to handle twenty four telephone calls simultaneously. For further services, the signal processing cards are connected via a data network to resource servers, e.g. a speech recognition server. While the call processing system of WO 02/27708 may be scalable to handle a large number of calls for IVR functions, it does not address the issue of how to provide efficiently speech recognition services concurrently to a large number of callers placing these calls.

U.S. Pat. No. 6,237,047 describes a voice processing system comprising a plurality of signal processing cards which are accessible to remote host computers via a data network. According to U.S. Pat. No. 6,237,047, the signal processing cards perform functions such as playing or recording sound, data/voice compression, voice recognition, or speaker authentication in accordance with commands received from the host computers. In operation, a user is connected via a PSTN to a signal processing card which supports several phone lines. The respective processing card answers the phone call from the user and establishes communication with a remote host computer issuing the commands. While allocating the remote host computers dynamically among the signal processing cards makes more efficient use of the remote host computers' processing power, it does not address the issue of how to provide efficiently speech recognition services concurrently to a large number of users.

U.S. Pat. No. 6,119,087 describes a system for voice processing which receives telephone calls via a telephone network and determines the grammar-type of a pending utterance from a caller. According to U.S. Pat. No. 6,119,087, the grammar-type indicates an expected type of speech such as a string of numbers, a person's name, a date, a stock quote, etc. According to U.S. Pat. No. 6,119,087 telephone lines are coupled in each case to a recognition client which has coupled thereto a speech application. The speech application causes the recognition client to play a user prompt and determines the grammar-type of incoming utterances. The voice processing system further comprises a load balancing resource manager which continually monitors speech recognition server devices with regards to their relative loading and relative efficiencies in handling a particular grammar-type. Based on the relative loading and relative efficiencies, the resource manager assigns a pending utterance for processing to a particular one of the speech recognition server devices, depending on the grammar-type of the utterance. While the resource manager of U.S. Pat. No. 6,119,087 may be advantageous in selecting a suitable speech recognition server, the required up-front determination of the grammar-type may not be suitable for handling speech controlled service requests from a large number of users.

SUMMARY OF THE INVENTION

It is an object of this invention to provide a system and a method for providing through voice interaction speech-based services to a plurality of users, which system and method do not have the disadvantages of the prior art. In particular, it is an object of the present invention to provide a system and a method for providing speech-based services to a plurality of users through connectivity ports accessed by the users via a telecommunication network. In particular, it is a further object of the present invention to provide a system and a method for performing voice-interactive speech-based services on a plurality of processing cores.

According to the present invention, these objects are achieved particularly through the features of the independent claims. In addition, further advantageous embodiments follow from the dependent claims and the description.

According to the present invention, the above-mentioned objects are particularly achieved in that in a voice interactive service system comprising a plurality of processing cores and providing different speech-based services to a plurality of users, the users accessing the system in each case with a communication terminal via a telecommunication network through one of a plurality of connectivity ports, the connectivity ports are each associated with one of the speech-based services. The processing cores have different configurations of speech processing resources, whereby the configuration of one processing core comprises the speech processing resources required for performing one of the speech-based services associated with at least one of the connectivity ports. Furthermore, for performing a specific one of the speech-based services requested by one of the users through a respective one of the connectivity ports, the system comprises means for connecting the respective one of the connectivity ports to one of the processing cores having a configuration of speech processing resources needed for performing the specific one of the speech-based services. For example, the means for connecting the connectivity ports to a selected one of the processing cores comprise fixed connections linking in each case one service-specific connectivity port to one service-specific processing core, fixed connections linking in each case one connectivity port to one port-specific processing core, and/or a matrix switch interconnecting service-specific connectivity ports to service-specific processing cores. Thus, the connection means establish fixed or dynamic connections between matching pairs of a connectivity port and a processing core having assigned the same service(s).

By setting up the processing cores with all the speech processing resources required for performing a specific one of the speech-based services associated with a connectivity port, the worst case computational requirements can be provided by one processing core. Depending on the processing power of a core and the computational requirements of a service, in an embodiment, a processing core is set up with resources for executing in a worst case scenario the services associated with a defined number of more than one connectivity ports. Although such a worst case configuration of processing cores may seem wasteful and inefficient, it has the advantage that, compared to prior art approaches, it does not require any overhead for requesting and allocating processing resources via a communication network from respective resource servers. External interfaces, required by conventional systems for accessing external processing resources, can be replaced by local interfaces using on-chip signal paths which make possible much faster response times than the network-distributed resources of the prior art systems. Moreover, with the port-dedicated resourcing of the processing cores, a user who successfully connects to a connectivity port will always—without delays or interruptions—be provided with the requested service as all necessary resources are already set up and available at the processing core dedicated to the respective connectivity port or service, respectively. In speech or voice-based interactive, dialogue controlled services where it is very difficult to foresee and predict the processing resources that will actually be required in real time, because a user may barge in and speak while the system issues a voice message, a user may interrupt himself or cough, or a user may access the service in an environment with distracting ambient noise, it is particularly advantageous to pre-arrange all the processing resources needed for performing the service(s).

In a preferred embodiment, the configurations of the processing cores include in each case a service-specific set and/or a port-specific set of speech processing resources which are stored permanently in memory associated with the respective processing core. For example, the speech processing resources comprise speech recognition resources, language-specific speech recognition resources, speech synthesis resources, language-specific speech synthesis resources, and/or dialogue control resources. Particularly, storing frequently used processing resources in on chip or on-core cache memory provides for efficient access to resources and, thus, service response time.

In an embodiment, the system comprises a data store having stored therein user-specific speech processing parameters, and a personalization module configured to load into memory associated with the selected one of the processing cores the processing parameters associated with the one of the users requesting the speech-based service, for a personalized configuration of the speech processing resources. For example, the user-specific speech processing parameters comprise a voice model, a vocabulary, terminal characteristics, dialogue experience, service history, and/or synthetic voice preferences.

In an embodiment, the processing cores are in each case a core of a multi-core processor, and the processing cores located on the same multi-core processor have the same configuration of speech processing resources.

In addition to the voice interactive service system, the present invention also relates to a method of providing different voice interactive speech-based services to a plurality of users. The users access and request the services in each case with a communication terminal via a telecommunication network through one of a plurality of connectivity ports. The connectivity ports are in each case associated with one of the speech-based services. A plurality of processing cores is associated with different configurations of speech processing resources. The configuration of one processing core comprises the speech processing resources required for performing one of the speech-based services associated with at least one of the connectivity ports. A specific one of the speech-based services is performed by connecting the connectivity port, which was used by the user to request the service, to one of the processing cores which has a configuration of speech processing resources required for performing the specific speech-based services.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
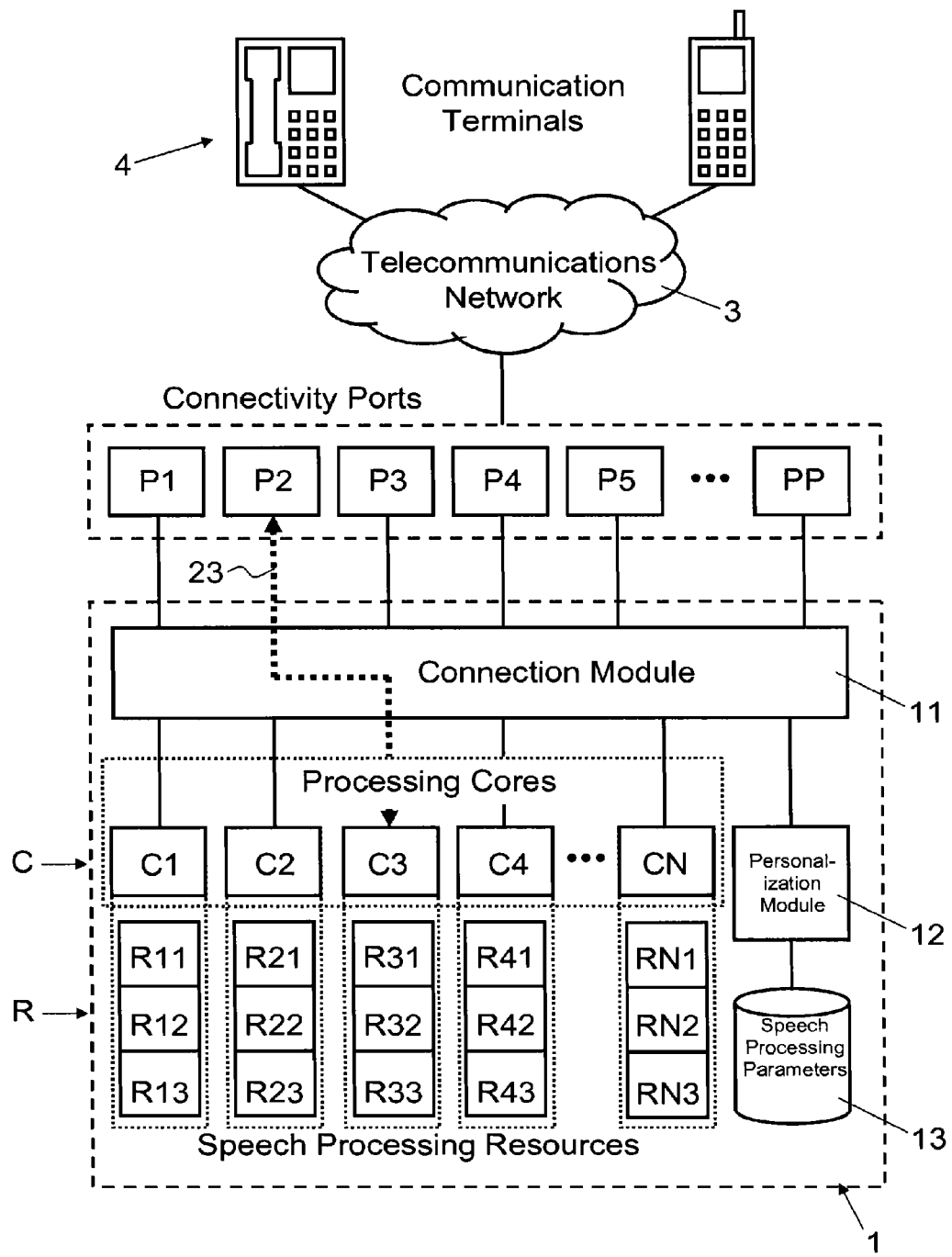
FIG. 1: shows a block diagram illustrating schematically a voice interactive service system with a plurality of processing cores and associated speech processing resources for providing through connectivity ports different speech-based services to a plurality of users.

In FIG. 1, reference numeral 4 refers to communication terminals, specifically voice communication terminals configured to communicate voice signals and/or voice data as well as other data via a telecommunications network 3. For example, the communication terminals 4 comprise a telephone for a public switched telephone network (PSTN), a telephone for voice over IP (Internet Protocol) services, and/or a mobile radio telephone, e.g. a terrestrial cellular telephone or a satellite-based telephone. Accordingly, the telecommunications network 3 comprises a fixed network, e.g. a PSTN, ISDN (Integrated Services Digital Network) and/or Internet network, and/or a mobile radio network, e.g. a GSM-network (Global System for Mobile communication), a UMTS-network (Universal Mobile Telephone System), another mobile radio telephone network and/or a wireless local area network (WLAN).

Figure 2:
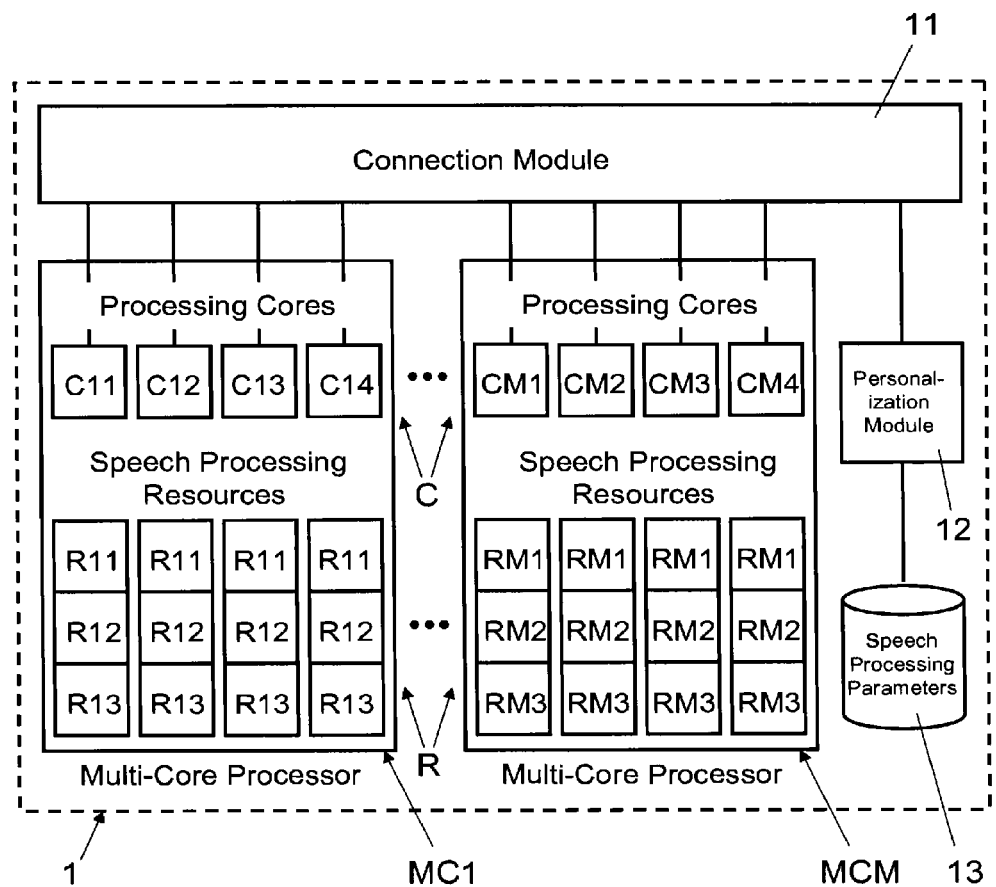
FIG. 2: shows a block diagram illustrating an exemplary configuration of the voice interactive service system having the processing cores arranged in several multi-core processors.

In FIGS. 1 and 2, reference numeral 1 refers to a voice interactive service system providing speech-based and/or voice-controlled services to a plurality of users of the communication terminals 4. These services include, for example, speech-based and/or voice-controlled information services which retrieve and/or store information as specified verbally, i.e. voice or speech controlled, by the user, which deliver the retrieved information in spoken i.e. speech-based form, and/or which guide the user through the service/application by way of a spoken, i.e. speech-based, dialogue control.

The voice interactive service system 1 comprises a plurality of processing cores C1, C2, C3, C4, CN, e.g. hundreds or thousands of processing cores. The processing cores C1, C2, C3, C4, CN are hardware based processing units often also referred to as central processing units (CPU).

As illustrated in FIG. 2, in a preferred embodiment the processing cores C11, C12, C13, C14, CM1, CM2, CM3, CM4 are independent parts (cores) of a multi-core processor MC1, MCN, e.g. a quad-core processor commercially available from companies such as Intel Corp. or Advanced Micro Devices, Inc. (AMD). Typically, the cores C11, C12, C13, C14, CM1, CM2, CM3, CM4 are integrated into a single integrated circuit die, i.e. a chip multiprocessor (CMP), or they are integrated onto multiple dies in a single chip package. Moreover, each core C11, C12, C13, C14, CM1, CM2, CM3, CM4 has its own local cache memory, so called level one (L1) cache, and on-die shared cache memory, so called level two (L2) cache.

As illustrated schematically in FIG. 1, different configurations of service processing resources are assigned to the processing cores C1, C2, C3, C4, CN. Specifically, in the example of FIG. 1, speech processing resources R11, R12, R13 are assigned to processing core C1, speech processing resources R21, R22, R23 are assigned to processing core C2, speech processing resources R31, R32, R33 are assigned to processing core C3, speech processing resources R41, R42, R43 are assigned to processing core C4, and speech processing resources RN1, RN2, RN3 are assigned to processing core CN. Preferably, the service processing resources are stored permanently in memory associated with the respective processing core C1, C2, C3, C4, CN. Depending on the embodiment and/or the type of service processing resource, the (speech) processing resources associated with a processing core C1, C2, C3, C4, CN are stored in L1 or L2 cache of the respective processing core C1, C2, C3, C4, CN, or on memory located on the same board or computer system as the respective processing core C1, C2, C3, C4, CN.

The configuration of service processing resources associated with each of the processing cores C1, C2, C3, C4, CN includes the complete set of speech processing resources and application resources required for performing all aspects of a specific speech-based service provided by the voice interactive service system 1. Specifically, the speech processing resources include different speech recognition resources R11, R21, R31, R41, RN1, RM1, e.g. different performance levels and/or language-specific speech recognition resources, different speech synthesis resources R12, R22, R32, R42, RN2, RM2, e.g. language-specific speech synthesis resources, and/or different service-/application-specific dialogue control resources R13, R23, R33, R43, RN3, RM3.

In the preferred embodiment illustrated in FIG. 2, the same (speech) processing resources {R11, R12, R13} or {RM1, RM2, RM3} are assigned to the processing cores {C11, C12, C13, C14} or {CM1, CM2, CM3, CM4] of the same multi-core processor MC1 or MCM, respectively.

As illustrated schematically in FIG. 1, the (speech-based) services provided by the voice interactive service system 1 are made available to users through connectivity ports P1, P2, P3, P4, P5, PP which are accessible to the users via telecommunications network 3. A connectivity port represents a service and communication interface between a requesting communication terminal 4 and the voice interactive service system 1, specifically between the communication terminal 4 and a specific one of the processing cores performing the service requested by the user of the communication terminal 4.

The connectivity ports P1, P2, P3, P4, P5, PP are associated with different services; specifically, the connectivity ports P1, P2, P3, P4, P5, PP are each associated with a specific one of the speech-based services or with a defined set (group) of the speech-based services. Table 1 shows an exemplary setup and allocation of services and service-specific connectivity ports. As indicated in Table 1, the services S1 (group G1), S2 (group G2) and S3 (group G3) are assigned to connectivity ports P1-P16, P17-P32, or P33-P48, respectively. The set of services S2 and S3 in group G4 are assigned to connectivity ports P49-P64, and the services S4 (group G5) are assigned to connectivity ports P65-P96.

TABLE 1

| Service Group | Service | Connectivity Port | Multi-Core Processor | Processing Core | Processing Resources |
|---|---|---|---|---|---|
| G1 | S1 | P1-P16 | MC1-MC4 | C11-C44 | R11, R12, R13 |
| G2 | S2 | P17-P32 | MC5 | C51-C54 | R51, R52, R53 |
| G3 | S3 | P33-P48 | MC6, MC7 | C61-C74 | R61, R62, R63 |
| G4 | S2 and S3 | P49-P64 | MC8-MC11 | C81-C114 | R51, R52, R53, R61, R62, R63 |
| G5 | S4 | P65-P96 | MC12-MC19 | C121-194 | R71, R72, R78 |
| ... | ... | ... | ... | ... | ... |

Table 1 further shows an exemplary setup and allocation of services and service-specific connectivity ports to multi-core processors, processing cores and their respective processing resources. In the example of Table 1, the services S1 of group G1, S2 of group G2, S3 of group G3, and the combined services S2 and S3 of group G4 are in each case available to users through a different pool of sixteen service-specific connectivity ports P1-P16, P17-P21, P33-P48, or P49-P64, respectively. Each of the sixteen connectivity ports P1-P16 associated with service S1 is handled by one of a corresponding number of (sixteen) processing cores C11-C44 which are all provided by four quad-core processors MC1-MC4 and set up with the same (speech) processing resources R11, R12, R13 (the notation of the processing cores Cij uses a first index number i referring to a multi-core processor, and a second index number j referring to a core on that multi-core processor). In the example of Table 1, services S2 and S3 are assumed to require less processing power so that one processing core is capable to perform the respective service S2, S3 concurrently for multiple connectivity ports; specifically, service S2 can be performed concurrently through connectivity ports P17-P32 by four processing cores C51-C54 which are all provided on one quad-core processor MC5 and set up with the same (speech) processing resources R51, R52, R53, whereas service S3 can be performed concurrently through connectivity ports P33-P48 by eight processing cores C61-C74 which are provided on two quad-core processors MC6, MC7 and set up with the same (speech) processing resources R61, R62, R63. Each of the sixteen connectivity ports P49-P64 associated with service group G4, i.e. the combination of service S2 and S3, is handled by one of a corresponding number of (sixteen) processing cores C81-C114 which are provided on four quad-core processors MC8-MC11 and set up with the same (speech) processing resources R51, R52, R53, R61, R62, R63. Moreover, in the example of Table 1, the service S4 of group G5 is available to users through thirty-two connectivity ports P65-P96. Each of the thirty-two connectivity ports P65-P96 associated with service S4 is handled by one of a corresponding number of (thirty-two) processing cores C121-C194 which are provided on four quad-core processors MC12-MC19 and are set up with the same (speech) processing resources R71, R72, R73.

As illustrated schematically in FIG. 1, the service-specific connectivity ports P1, P2, P3, P4, P5, PP are connected through connection module 11 to one of the processing cores C1, C2, C3, C4, CN set up to perform the service assigned to the respective connectivity port P1, P2, P3, P4, P5, PP. The connection module 11 is configured to establish, permanently or dynamically as needed, a connection between a service-specific connectivity port P1, P2, P3, P4, P5, PP and a processing core C1, C2, C3, C4, CN associated with the same (speech-based) service. For a dynamic allocation (connection) between matching pairs of service-specific connectivity ports P1, P2, P3, P4, P5, PP and service-specific processing cores C1, C2, C3, C4, CN, the connection module 11 comprises a switching module, e.g. a matrix or array switching module. Permanent or temporary connections may be defined in a connection table comprising service-specific associations of connectivity ports P1, P2, P3, P4, P5, PP and processing cores C1, C2, C3, C4, CN. Dynamic assignment/connection of a connectivity port P1, P2, P3, P4, P5, PP to a processing core C1, C2, C3, C4, CN may further depend on similarity of user-specific speech processing parameters and/or service/application parameters already loaded in the memory associated with a processing core C1, C2, C3, C4, CN. In FIG. 1, the double-headed dotted arrow 23 indicates schematically an established connection between connectivity port P2 and processing core C3 for performing a service using the (speech) processing resources R31, R32, R33 stored in memory associated with processing core C3.

In an embodiment, the voice interactive service system 1 comprises a personalization module 12 and a data store 13, e.g. a database, comprising user-specific speech processing parameters and service/application parameters. Preferably, the personalization module 12 is implemented as a programmed software module comprising computer program code configured to control a processor of a computer of the voice interactive service system 1. For example, the personalization module 12 is arranged in a housing common with the connection module 11 and/or the processing cores. For example, the data store 13 is implemented on the same computer as the personalization module 12 or on a separate computer connected to the personalization module 12 via a communication link, e.g. a data bus or a communication network. Different (speech-based) services may require different user-specific parameters. The personalization module 12 is configured to establish a user- and service-specific configuration of the processing cores C1, C2, C3, C4, CN and/or (speech) processing resources R11, R12, R13, R21, R22, R23, R31, R32, R33 based on the user- and service-specific speech and application processing parameters. For example, the user- and service-specific speech processing parameters include an acoustic model or voice model of the user, a user's (spoken, known) vocabulary, a user's used language(s), his/her sex, and/or the preferred speaker's voice (for speech synthesis). The user- and service-specific speech processing parameters may further include dialogue control parameters such as dialogue experience/familiarity level or information, as well as preferences and/or history with specific services, applications and/or topics. In an embodiment, the user- and service-specific speech processing parameters further comprise characteristics of equipment and/or communication channels used by the user.

Figure 3:
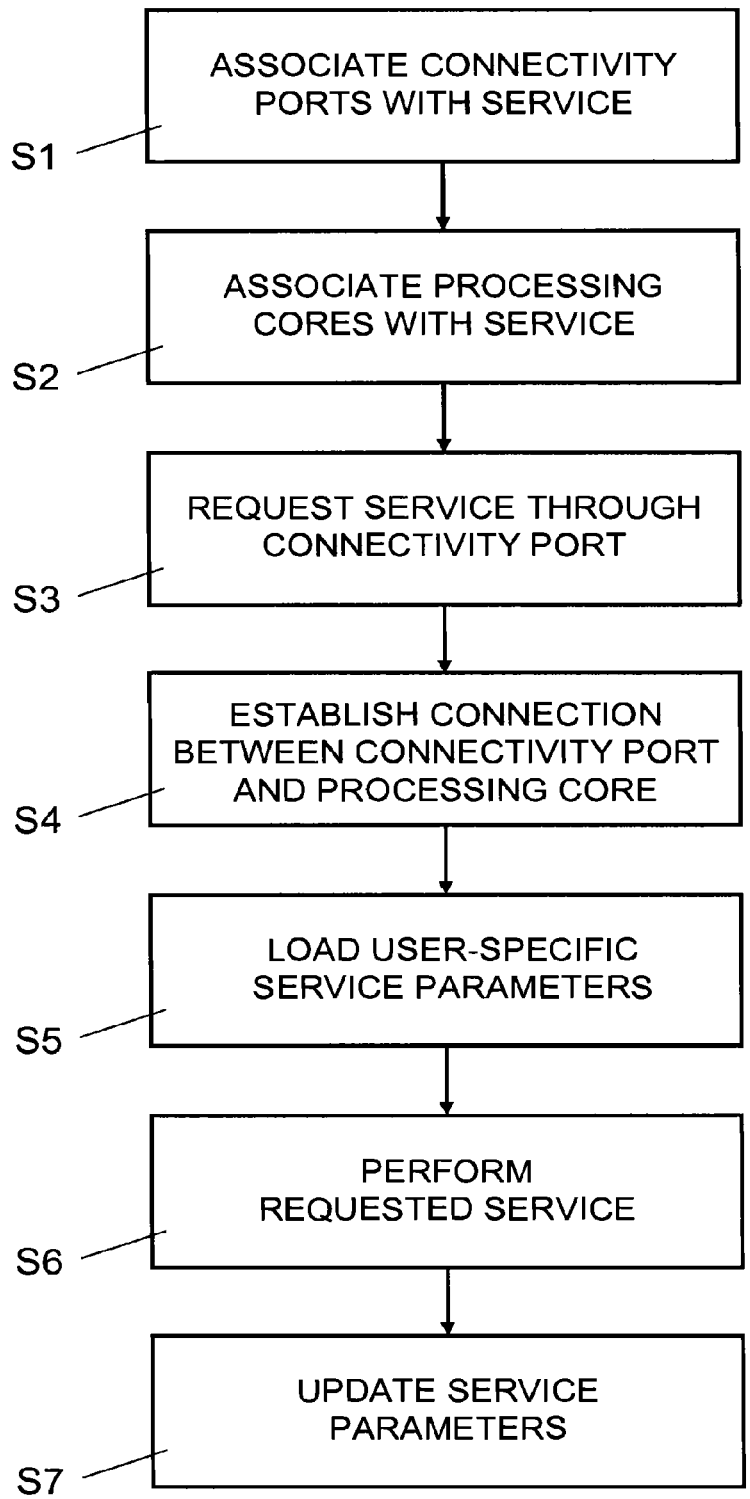
FIG. 3: shows a flow diagram illustrating a possible sequence of steps for providing different voice interactive speech-based services to a plurality of users.

In the following paragraphs, described with reference to FIG. 3 is a possible sequence of steps performed by functional modules of the voice interactive service system 1 for providing different voice interactive speech-based services to a plurality of users.

In preparatory step S1, the connectivity ports P1, P2, P3, P4, P5, PP are each associated with a specific (voice interactive) speech-based service or with a defined set (group) of these services (e.g. in a port service association table).

In preparatory step S2, the processing core C1, C2, C3, C4, CN are each associated with a specific (voice interactive) speech-based service or with a defined set (group) of these services. Accordingly, the processing cores C1, C2, C3, C4, CN are each assigned service-specific configurations of service processing resources, i.e. service-specific speech processing resources including speech recognition resources, speech synthesis resources, and/or dialogue control resources.

In step S3, using his communication terminal 4, a user requests a (voice interactive) speech-based service by connecting via telecommunications network 3 to a corresponding service connectivity port P2.

In step S4, if connections between service connectivity ports P1, P2, P3, P4, P5, PP and service-specific processing cores C1, C2, C3, C4, CN are not set up statically, the connection module 11 establishes a service connection between the service connectivity port P2 and a respective processing core C3 configured to perform the service.

In step S5, the personalization module 12 establishes a user and service-specific configuration of the processing core C3 and/or its associated (speech) processing resources R31, R32, R33. For example, the personalization module 12 is invoked by the service-specific connectivity port P2 receiving the service request or by the processing core C3 assigned to execute the requested service. Specifically, the personalization module 12 determines the identity of the user requesting the service. Depending on the embodiment, the identity of the user is determined through caller voice identification, automatic number identification (ANI), remote biometric identification, and/or user identification login functions, for example. Depending on the embodiment, the personalization module 12 also determines the (type of) communication terminal 4 and/or telecommunications network 3 used by the user to request the service. Once and if the user identity has been determined, the user-specific—and if applicable, service-specific—speech processing parameters and service/application parameters are retrieved (read) by the personalization module 12 from the corresponding user profile stored in data store 13. Depending on the embodiment, the personalization module 12 also retrieves speech processing parameters and service/application parameters specific to equipment and/or communication channels used by the user. Otherwise, if the user is not known to the system, a user identifier is determined and assigned to a new user profile which is set up based on initial start-up parameters. The user-specific, and possibly service-specific, equipment-specific and/or communication channel specific speech processing parameters and service/application parameters are loaded (written) by the personalization module 12 into memory associated with the processing core C3 set up and connected to perform the respective (speech-based) service requested by the user. For example, the parameters are loaded by the personalization module 12 through a data bus via the connection module 11 or directly into memory associated with the processing core C3.

In step S6, the processing core C3 which is connected to the service-specific connectivity port P2 for performing the requested service, performs the requested service using the respective (speech) processing resources R31, R32, R33 and the user-specific, and possibly service-specific, speech processing parameters and service/application parameters, as well as parameters specific to equipment and/or communication channels used by the user, if applicable.

In optional step S7, the user-specific, and possibly service-specific, equipment-specific and/or communication channel specific, speech processing and service/application parameters are updated in the data store 13 based on the actual performance of a (speech) based service requested by the user. For example, the service parameters are updated dynamically during execution of the requested service and/or upon completion or termination of the service. Particularly, the speech processing parameters are adapted as a result of the actual speech recognition process executed for the user, and dialogue parameters are updated as a consequence of actual dialogues performed with the user, etc.

It should be noted that, in the description, the computer program code has been associated with specific functional modules and the sequence of the steps has been presented in a specific order, one skilled in the art will understand, however, that the computer program code may be structured differently and that the order of at least some of the steps could be altered, without deviating from the scope of the invention.

What is claimed is:
1. A system comprising:
a plurality of processing components;
a connection component for coupling the plurality of processing components to a plurality of connectivity ports; and
wherein:
each of the plurality of connectivity ports is associated with at least one of a plurality of different speech-related services;
associating the plurality of connectivity ports with the plurality of different speech-related services is performed before receiving user service requests from a plurality of users;
each of the plurality of processing components is configurable for performing at least one of the plurality of different speech-related services; and
when providing a specific one of the plurality of different speech-related services that is requested by one of the plurality of users through a respective one of the plurality of connectivity ports, the connection component is operable to couple the respective one of the plurality of connectivity ports to a selected one of the plurality of processing components based on the selected one of the plurality of processing compo- nents being configurable for performing the specific one of the plurality of different speech-related services.

2. The system of claim 1, wherein configuring each processing component of the plurality of processing components for performing a particular speech-related service is based on use of one or more speech processing resources.

3. The system of claim 2, wherein the one or more speech processing resources are stored permanently in memory associated with the respective processing component.

4. The system of claim 2, wherein the one or more speech processing resources comprise at least one of a service-specific set of speech processing resources and a port-specific set of speech processing resources.

5. The system of claim 2, wherein the one or more speech processing resources comprise at least one of speech recognition resources, language-specific speech recognition resources, speech synthesis resources, language-specific speech synthesis resources, and dialogue control resources.

6. The system of claim 1, further comprising a data storing component operable to store user-specific speech processing parameters.

7. The system of claim 6, wherein the user-specific speech processing parameters comprise at least one of a voice model, a vocabulary, terminal characteristics, dialogue experience, service history, and synthetic voice preferences.

8. The system of claim 7, wherein the processing parameters associated with the one of the plurality of users requesting the specific one of the plurality of different speech-related services are used for a personalized configuration of one or more speech processing resources for one of the plurality of processing components.

9. The system of claim 1, further comprising a personalization component that is operable to load into a memory associated with the selected one of the plurality of processing components, processing parameters associated with the one of the plurality of users requesting the specific one of the plurality of different speech-related services.

10. The system of claim 1, wherein the plurality of processing components are in each case a component of a multi-component processor; and the plurality of processing components located on the same multi-component processor have the same configuration of speech processing resources.

11. The system of claim 1, wherein the connection component comprises at least one of:
fixed connections linking in each case a specific connectivity port to a processing component associated with the specific connectivity port,
fixed connections linking in each case a connectivity port associated with a specific speech-related service to a processing component configurable for performing the specific speech-related service, and
a matrix switch interconnecting the plurality of the connectivity ports to the plurality of processing components.

12. A method comprising:
receiving by a service system, via one of a plurality of connectivity ports, a service request from one of a plurality of users for a specific one of the plurality of different speech-related services; wherein:
  each of the plurality of connectivity ports is associated with at least one of the plurality of different speech-related services;
  associating the plurality of connectivity ports with the plurality of different speech-related services is performed before receiving user service requests from a plurality of users;
selecting in the service system, one of a plurality of processing components of the service system, wherein:
  each of the plurality of processing components is configurable for performing at least one of the plurality of different speech-related services; and
  the one of the plurality of processing components is selected based on being configurable for performing the specific one of the plurality of different speech-related services; and
coupling the selected one of the plurality of processing components to the respective one of the plurality of connectivity ports; and
providing the specific one of the plurality of different speech-related services that is requested by the one of the plurality of users, using the selected one of the plurality of processing components.

13. The method of claim 12, comprising configuring each processing component of the plurality of processing components for performing a particular speech-related service is based on use of one or more speech processing resources.

14. The method of claim 13, comprising permanently storing the one or more speech processing resources in memory associated with a respective processing component.

15. The method of claim 13, wherein the one or more speech processing resources comprise at least one of a service-specific set of speech processing resources and a port-specific set of speech processing resources.

16. The method of claim 13, wherein the one or more speech processing resources comprise at least one of speech recognition resources, language-specific speech recognition resources, speech synthesis resources, language-specific speech synthesis resources, and dialogue control resources.

17. The method of claim 12, comprising storing user-specific speech processing parameters.

18. The method of claim 17, wherein the user-specific speech processing parameters comprise at least one of a voice model, a vocabulary, terminal characteristics, dialogue experience, service history, and synthetic voice preferences.

19. The method of claim 12, comprising loading into a memory associated with the selected one of the plurality of processing components, processing parameters associated with the one of the plurality of users requesting the specific one of the plurality of different speech-related services.

20. The method of claim 19, wherein the processing parameters associated with the one of the plurality of users requesting the specific one of the plurality of different speech-related services are used for a personalized configuration of one or more speech processing resources for one of the plurality of processing components.

* * * * *